US009646224B2

(12) United States Patent
Zhang (10) Patent No.: US 9,646,224 B2
(45) Date of Patent: May 9, 2017

(54) IMAGE PROCESSING METHOD, IMAGE PROCESSING DEVICE AND AUTOMATED OPTICAL INSPECTION MACHINE

(71) Applicant: SHENZHEN CHINA STAR OPTOELECTRONICS TECHNOLOGY CO., LTD., Shenzhen, Guangdong (CN)

(72) Inventor: Yueyan Zhang, Shenzhen (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 223 days.

(21) Appl. No.: 14/375,714

(22) PCT Filed: May 15, 2014

(86) PCT No.: PCT/CN2014/077579
§ 371 (c)(1),
(2) Date: Jul. 30, 2014

(87) PCT Pub. No.: WO2015/158024
PCT Pub. Date: Oct. 22, 2015

(65) Prior Publication Data
US 2015/0294452 A1    Oct. 15, 2015

(30) Foreign Application Priority Data

Apr. 14, 2014  (CN) .......................... 2014 1 0147746

(51) Int. Cl.
*G06K 9/00*  (2006.01)
*G06K 9/62*  (2006.01)
*G06T 7/00*  (2017.01)

(52) U.S. Cl.
CPC .......... *G06K 9/6202* (2013.01); *G06T 7/0006* (2013.01); *G06T 2207/30121* (2013.01)

(58) Field of Classification Search
None
See application file for complete search history.

(56) References Cited

U.S. PATENT DOCUMENTS 6,324,298 B1 *  11/2001  O'Dell ............... G01N 21/9501
                                                        257/E21.53
6,636,298 B1 *  10/2003  Bachelder .......... G01N 21/8806
                                                        356/73.1
(Continued)

FOREIGN PATENT DOCUMENTS

CN         101527040 A       9/2009
CN         201440128 U       4/2010
(Continued)

OTHER PUBLICATIONS

International Search Report dated Jan. 13, 2015.

*Primary Examiner* — Vikkram Bali
(74) *Attorney, Agent, or Firm* — Stein IP, LLC (57) ABSTRACT

The present disclosure relates to an image processing method, an image processing device, and an automated optical inspection machine. The method includes: an inspection area determining step for determining a rectangular inspection area in an inspected image; a definition threshold determining step for calculating an image definition threshold according to the gray values of pixels of a plurality of sample images in the inspection area; a product image definition determining step for calculating a product image definition according to the gray values of pixels of a product image in the inspection area; and a comparison step for comparing the product image definition with the image (Continued)

definition threshold; and a product image selecting step for selecting the current product image as an image to be inspected.

11 Claims, 7 Drawing Sheets

(56) References Cited

U.S. PATENT DOCUMENTS

| 2002/0060755 | A1* | 5/2002 | Liu | G02F 1/1309 349/1 |
| 2009/0041349 | A1 | 2/2009 | Suzuki et al. | |
| 2014/0098336 | A1* | 4/2014 | Mo | G02F 1/133788 349/192 |

FOREIGN PATENT DOCUMENTS

| CN | 102609939 A | 7/2012 |
| CN | 103686148 A | 3/2014 |

* cited by examiner

|   | 1 | 2 | 3 | 4 | 5 | 6 |
|---|---|---|---|---|---|---|
| A | 154 | 140 | 130 | 80 | 60 | 120 |
| B | 148 | 139 | 138 | 80 | 62 | 121 |
| C | 150 | 133 | 138 | 83 | 58 | 122 |
| D | 151 | 136 | 138 | 81 | 57 | 123 |

Fig. 8

|   | 1 | 2 | 3 | 4 | 5 | 6 |
|---|---|---|---|---|---|---|
| A | 160 | 139 | 130 | 80 | 65 | 121 |
| B | 148 | 140 | 137 | 80 | 62 | 122 |
| C | 150 | 135 | 139 | 82 | 59 | 123 |
| D | 151 | 136 | 140 | 80 | 55 | 122 |

Fig. 9

IMAGE PROCESSING METHOD, IMAGE PROCESSING DEVICE AND AUTOMATED OPTICAL INSPECTION MACHINE

FIELD OF THE INVENTION

The present disclosure relates to the technical field of automated optical measurement, in particular to an image processing method, an image processing device, and an automated optical inspection machine.

BACKGROUND OF THE INVENTION

A thin film transistor liquid crystal display (TFT-LCD) is being developed towards large size and high resolution, and the requirement of customers for visual perception of a display screen is increasingly high. Generally, the quality of the TFT-LCD product is monitored by means of automated optical inspection (AOI) equipment. However, vibration generally appears during operation of the AOI equipment, so that the definition of images taken by a camera is reduced, thus affecting the inspection result.

Figure 1:
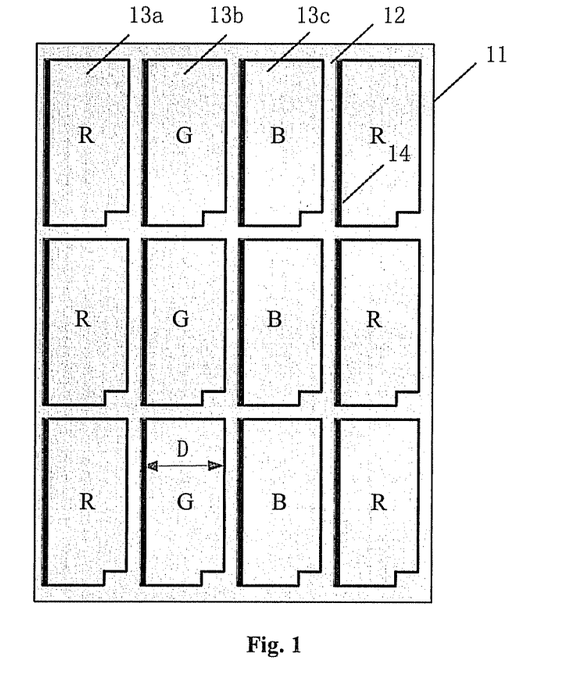
FIG. 1 is a schematic diagram showing the distribution of RGB sub-pixels of a color filter in the prior art.

FIG. 1 is a schematic diagram showing distribution of RGB sub-pixels of a color filter in the prior art. Black matrixes (BM) 12 are arranged on a substrate 11, and red sub-pixels 13a, green sub-pixels 13b and blue sub-pixels 13c are arranged between the black matrixes 12 at intervals. Generally, the width D of each black matrix is used as a critical dimension (CD). During the process of manufacturing TFT-LCD, the RGB sub-pixels will be overlapped with the black matrixes 12, so as to form overlays 14.

Figure 2:
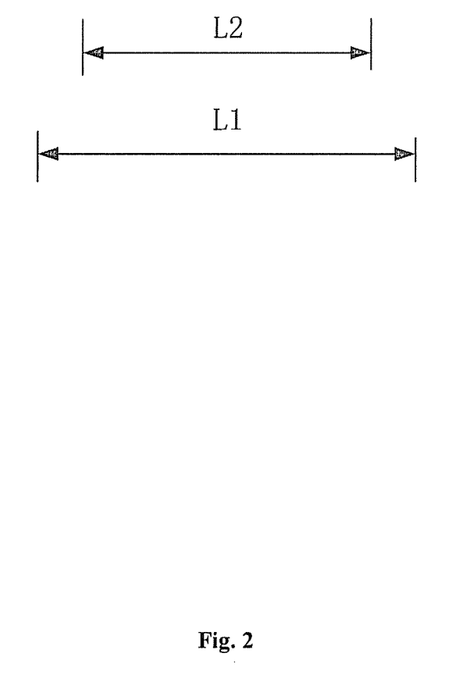
FIG. 2 is a schematic diagram of a fuzzy overlay in a scanned image due to vibration.

The critical dimension CD and overlay width of the TFT-LCD product are measured through the AOI equipment in the production process to inspect the quality of the product. Generally, the AOI equipment vibrates in operation, so that the definition of a scanned image is reduced. For example, the critical dimension and the overlays are fuzzy, and the margin thereof is unclear. As a result, the measurement result is inaccurate, and even misjudgment may be caused. FIG. 2 is a schematic diagram of a fuzzy overlay in a scanned image due to vibration. As shown in FIG. 2, the measured width L2 of the overlay is smaller than the width L1 of a normal overlay.

At present, a method for reducing the vibration of the AOI equipment is to perform anti-vibration treatment on a floor below a machine, or transform a rolling device of a substrate supporting body of the machine into a platform. Further, an air floatation function may be incorporated into a base of the platform, so as to reduce substrate vibration caused by ambient vibration.

Based on the above-mentioned conditions, however, an improved AOI image processing method is urgently needed to solve the technical problem that the definition of a scanned image is reduced due to equipment vibration.

SUMMARY OF THE INVENTION

Aiming at the above-mentioned problems in the prior art, the present disclosure provides an image processing method for an automated optical inspection process, including:

an inspection area determining step, for determining a rectangular inspection area in an inspected image;

a definition threshold determining step, for calculating an image definition threshold according to the gray values of pixels of a plurality of sample images in the inspection area;

a product image definition determining step, for calculating a product image definition according to the gray values of pixels of a product image in the inspection area; and a comparison step, for comparing the product image definition with the image definition threshold, wherein when the product image definition is greater than the image definition threshold, a product image selecting step for selecting the current product image as an image to be inspected is executed, and when the product image definition is smaller than the image definition threshold, the product image definition determining step is executed.

According to an embodiment of the present disclosure, the definition threshold determining step includes:

a sample scanning step, for scanning one and the same inspection sample for multiple times to acquire a plurality of sample images matched with a standard image; and a threshold calculating step, for acquiring the gray values of pixels of the plurality of sample images in the inspection area respectively and calculating the image definition threshold.

According to an embodiment of the present disclosure, the product image definition determining step includes:

a product scanning step, for scanning a product to acquire the product image; and an image definition calculating step, for acquiring the gray values of pixels of the product image in the inspection area and calculating the product image definition.

According to an embodiment of the present disclosure, the threshold calculating step includes:

acquiring the gray values of pixels of each sample image in the inspection area;

calculating the absolute value of a difference between the gray values of adjacent pixels of each row of each sample image in the inspection area respectively, selecting the maximum absolute value as a sample image row gray difference, and selecting the maximum sample image row gray difference as the sample definition of the current sample image; and selecting the minimum of all sample definitions as the image definition threshold.

According to an embodiment of the present disclosure, the image definition calculating step includes:

acquiring the gray values of pixels of the product image in the inspection area; and calculating the absolute value of a difference between the gray values of adjacent pixels of each row of the product image in the inspection area respectively, selecting the maximum absolute value as a product image row gray difference, and selecting the maximum product image row gray difference as the product image definition.

According to another aspect of the present disclosure, provided is an image processing device used in an automated optical inspection machine, including:

an inspection area determining unit, configured to determine a rectangular inspection area in an inspected image;

a definition threshold determining unit, configured to calculate an image definition threshold according to the gray values of pixels of a plurality of sample images in the inspection area;

a product image definition determining unit, configured to calculate a product image definition according to the gray values of pixels of a product image in the inspection area;

a comparison unit, configured to compare the product image definition with the image definition threshold, wherein when the product image definition is greater than the image definition threshold, a product image selecting unit is called, and when the product image definition is smaller than the image definition threshold, the product image definition determining unit is called; and the product image selecting unit, configured to select the current product image as an image to be inspected.

According to an embodiment of the present disclosure, the definition threshold determining unit further includes:

a sample scanning subunit, configured to scan one and the same inspection sample for multiple times to acquire a plurality of sample images matched with a standard image; and a threshold calculating subunit, configured to acquire the gray values of pixels of each sample image in the inspection area, calculate the absolute value of a difference between the gray values of adjacent pixels of each row of each sample image in the inspection area respectively, select the maximum absolute value as a sample image row gray difference, select the maximum sample image row gray difference as the sample definition of the current sample image, and select the minimum of all sample definitions as the image definition threshold.

According to an embodiment of the present disclosure, the product image definition determining unit further includes:

a product scanning subunit, configured to scan a product to acquire a product image; and an image definition calculating subunit, configured to acquire the gray values of pixels of the product image in the inspection area, calculate the absolute value of a difference between the gray values of adjacent pixels of each row of the product image in the inspection area respectively, select the maximum absolute value as a product image row gray difference, and select the maximum product image row gray difference as the product image definition.

According to a further aspect of the present disclosure, provided is an automated optical inspection machine, including the above-mentioned image processing device, and further including an inspection device configured to perform optical inspection according to the image to be inspected.

The present disclosure brings the following beneficial effects. For different types of products, the definition threshold determining unit may calculate the definition thresholds corresponding to the products through multiple times of scanning, so that an accurate AOI inspection can be provided for each type of the products. During the image processing procedure, because only the gray difference of the pixels in the inspection area adjacent to a measurement object is calculated, the calculation is low load, simple and convenient. Thus the inspection efficiency can be greatly improved. In addition, the calculation of image definition is added and the definition threshold is set in the image processing procedure, an inspection standard can be provided for identical products in the presence of machine vibration, so that the inspection quality of the AOI equipment can be improved.

Other features and advantages of the present disclosure will be set forth in the following description, and in part will be obvious from the description, or be self-evident by implementing the present disclosure. The objectives and other advantages of the present disclosure may be achieved and obtained by structures particularly pointed out in the description, the claims and the accompanying drawings.

BRIEF DESCRIPTION OF THE DRAWINGS

Specific implementations of the present disclosure will be further illustrated in detail below in combination with the accompanying drawings.

DETAILED DESCRIPTION OF THE EMBODIMENTS

A detailed description of the implementation modes of the present disclosure will be given below, in combination with the accompanying drawings and embodiments, whereby an implementation process of how to use technical means of the present disclosure to solve the technical problems and achieve a technical effect may be fully understood and then implemented accordingly. It should be noted that, as long as no conflict is generated, various embodiments of the present disclosure and various features of the embodiments may be combined with each other, and the formed technical solutions are all within the protection scope of the present disclosure.

Embodiment I

Figure 3:
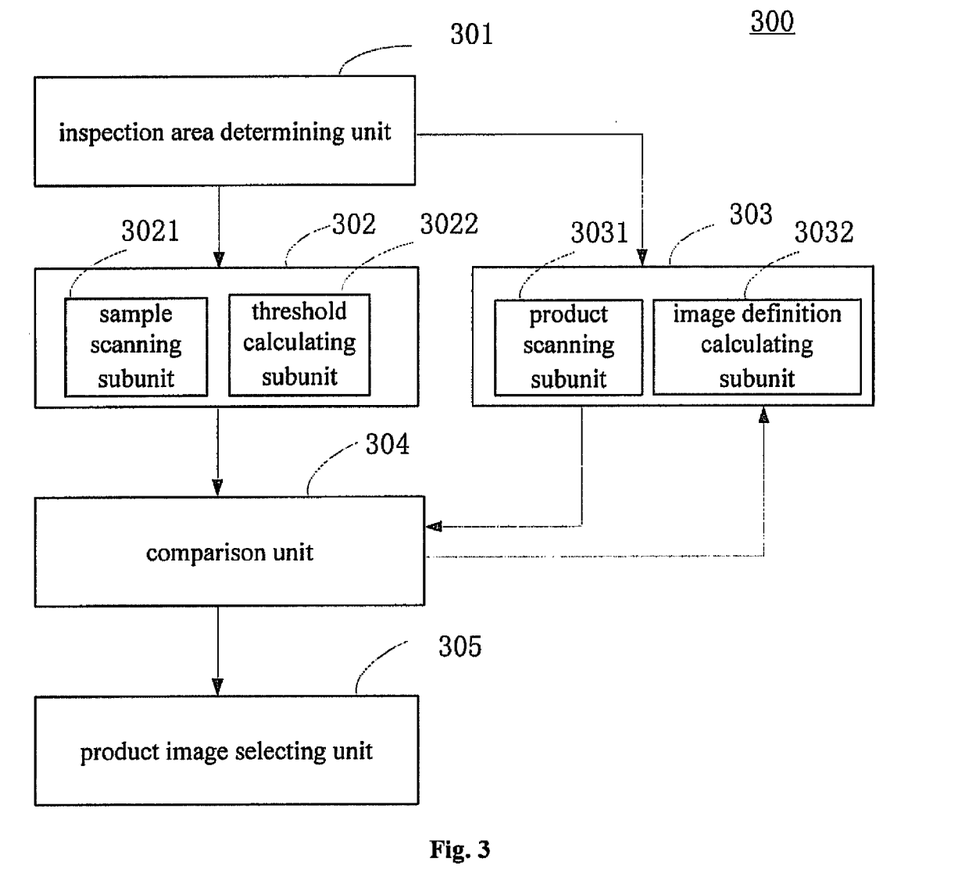
FIG. 3 is a schematic diagram of functional modules of an image processing device in an embodiment of the present disclosure.

FIG. 3 is a schematic diagram showing functional modules of an image processing device according to an embodiment of the present disclosure. The image processing device 300 includes an inspection area determining unit 301, which is configured to determine a rectangular inspection area in an inspected image. Preferably, but not limited to, the inspection area determining unit 301 can select one of areas in rectangular boxes 401, 402 and 403 shown in FIG. 4 as the rectangular inspection area.

The image processing device 300 further includes a definition threshold determining unit 302, which is configured to calculate an image definition threshold according to the gray values of pixels of a plurality of sample images in the inspection area. Preferably, the definition threshold determining unit 302 further includes a sample scanning subunit 3021, which is configured to scan one and the same inspection sample for multiple times to acquire a plurality of sample images matched with a standard image, and a threshold calculating subunit 3022, which is configured to acquire the gray values of pixels of the plurality of sample images in the inspection area respectively, and calculate the image definition threshold.

Specifically, the threshold calculating subunit 3022 is configured to acquire the gray values of pixels of each sample image in the inspection area, and calculate the absolute value of a difference between the gray values of adjacent pixels of each row of each sample image in the inspection area respectively. Then, the threshold calculating subunit 3022 selects the maximum absolute value as a sample image row gray difference, selects the maximum sample image row gray difference as the sample definition of the current sample image, and select the minimum of all sample definitions as the image definition threshold.

The image processing device 300 further includes a product image definition determining unit 303, which is configured to calculate a product image definition according to the gray values of pixels of a product image in the inspection area. Preferably, the product image definition determining unit 303 further includes a product scanning subunit 3031, which is configured to scan a product to acquire a product image, and an image definition calculating subunit 3032, which is configured to acquire the gray values of pixels of the product image in the inspection area and calculate the product image definition.

Specifically, the image definition calculating subunit 3032 is configured to acquire the gray values of pixels of the product image in the inspection area, and calculate the absolute value of a difference between the gray values of adjacent pixels of each row of the product image in the inspection area respectively. Then, the image definition calculating subunit 3032 selects the maximum absolute value as a product image row gray difference, and selects the maximum product image row gray difference as the product image definition.

The image processing device 300 further includes a comparison unit 304, which is configured to compare the product image definition with the image definition threshold. When the product image definition is greater than the image definition threshold, a product image selecting unit 305 is called. And when the product image definition is smaller than the image definition threshold, the product image definition determining unit 303 is called.

The image processing device 300 further includes the product image selecting unit 305, which is configured to select the current product image as an image to be inspected when the product image definition is greater than the image definition threshold.

Embodiment II

Figures 5, 6:
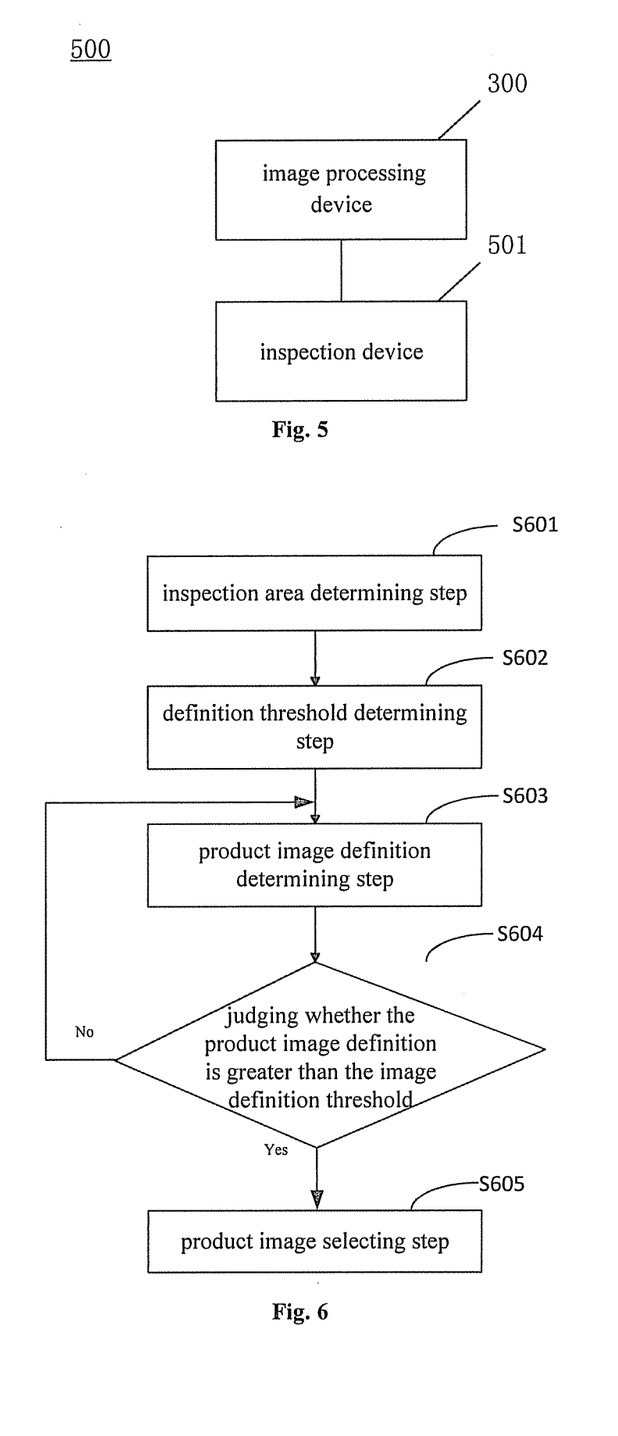
FIG. 5 is a schematic diagram of functional modules of an automated optical inspection machine in an embodiment of the present disclosure.
FIG. 6 is a flow chart of an image processing method in an embodiment of the present disclosure.

As shown in FIG. 5, the embodiment of the present disclosure further provides an automated optical inspection machine 500, including the image processing device 300 and an inspection device 501 configured to perform optical inspection according to the image to be inspected. Reference can be made to FIG. 3 and its description for the function of the image processing device 300, which is not redundantly described herein.

Embodiment III

This embodiment provides an image processing method for use in an automated optical inspection process, and will be illustrated below in combination with FIG. 6.

Figure 4:
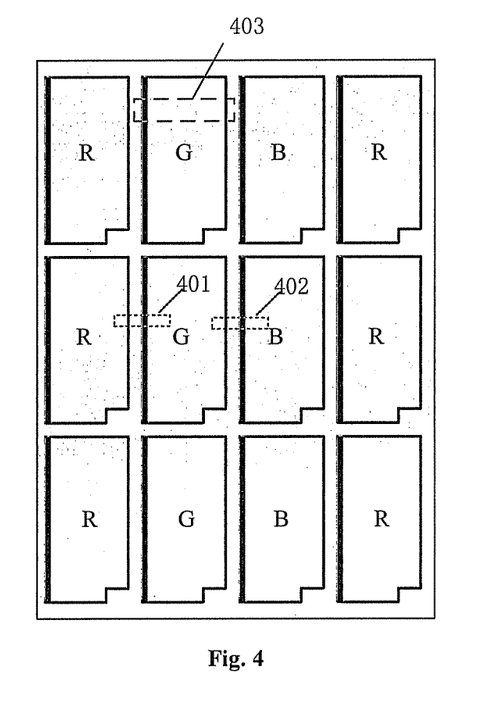
FIG. 4 is a schematic diagram of a rectangular inspection area determined in an embodiment of the present disclosure.

In Step S601 of the method, the inspection area determining unit 301 determines a rectangular inspection area in an inspected image. Preferably, in an AOI software Recipe parameter setting step, an inspection area adjacent to a measurement object is selected. For example, one of or a combination of areas in rectangular boxes 401, 402 and 403 shown in FIG. 4 is set as the inspection area. The inspection areas in the rectangular boxes 401 and 402 may be used for measuring the width of an overlay, and the inspection area in the rectangular box 403 may be used for measuring the critical dimension CD. In the calculation of this embodiment, the area in the rectangular box 401 is used as the rectangular inspection area.

In Step S602 of the method, the definition threshold determining unit 302 scans one and the same inspection sample for multiple times to acquire a plurality of sample images matched with a standard image. Then, the definition threshold determining unit 302 acquires the gray values of pixels of the plurality of sample images in the inspection area respectively, and calculates the image definition threshold.

Figure 7A:
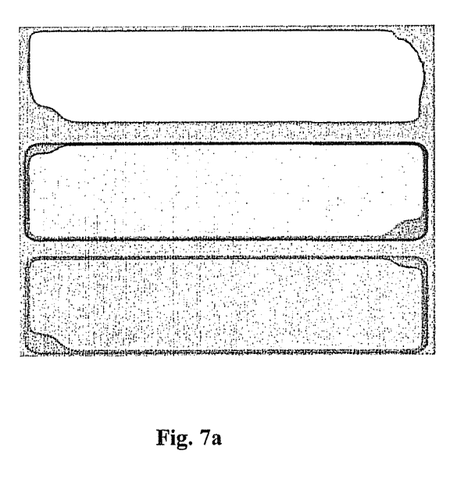
FIG. 7a is a sample image with relatively low definition in an embodiment of the present disclosure.
Figure 7B:
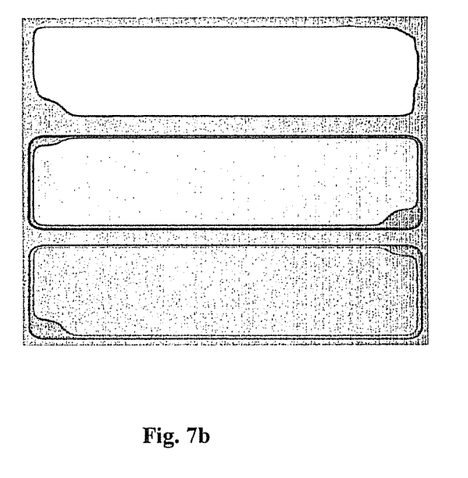
FIG. 7b is a sample image with relatively high definition in an embodiment of the present disclosure.

Specifically, firstly, the sample scanning subunit 3021 scans the same inspection sample for multiple times to acquire a plurality of sample images matched with the standard image. For example, FIG. 7a and FIG. 7b show two sample images obtained by scanning the same inspection sample twice and matched with the standard image. The definition of the sample image in FIG. 7a is relatively low, and the image is fuzzy. Therefore, it indicates that the vibration of an AOI machine in the scanning process is relatively high. In comparison, the definition of the sample image in FIG. 7b is relatively high, and the image is clear. Therefore, it indicates that the vibration of the AOI machine in the scanning process is relatively low. However, the sample images shown in FIG. 7a and FIG. 7b are both matched with the standard image, indicating that the measurement error caused by vibration of the AOI equipment can be tolerable. Then, the threshold calculating subunit 3022 acquires the gray values of pixels of the plurality of sample images in the inspection area respectively, and calculates the image definition threshold.

Figure 8:
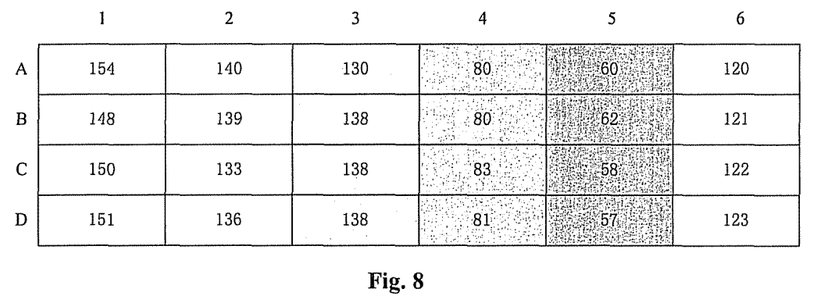
FIG. 8 is a schematic diagram showing the distribution of pixel grays in the rectangular inspection area of a sample image in an embodiment of the present disclosure.

FIG. 8 schematically shows the distribution of pixel grays of the sample image 7a in the inspection area of the rectangular box 401. The inspection area includes four rows and six columns of pixels, the rows being named as A, B, C and D respectively. The calculation performed by the image definition threshold calculating subunit 3022 is illustrated with the pixel gray distribution shown in FIG. 8 as an example.

The gray values of each row of pixels are acquired. The absolute value of a difference between the gray values of adjacent pixels of each row is calculated respectively. For example, in the row A, it can be obtained that |A1−A2|=14, |A2−A3|=10, |A3−A4|=50, |A4−A5|=20 and |A5−A6|=60 through calculation. Thus the maximum absolute value in the row A is 60, i.e., the gray difference in row A of the sample image in FIG. 7a is 60. Similarly, the row gray differences in the rows B, C and D are calculated, which are respectively 59, 64 and 66. Then, the maximum value, 66, of the row gray differences of the sample image in FIG. 7a is selected as the sample definition of the sample image in FIG. 7a. In addition, the minimum of all sample definitions is selected as the image definition threshold. For example, the sample definition in FIG. 7b is 70, and the image definition threshold is 66.

In this step, through calculating the sample image definition threshold, an inspection standard for identical products is provided in the presence of machine vibration. Therefore, the influence of machine vibration is eliminated, and the inspection quality of the AOI equipment is improved.

In Step S603 of the method, the product image definition determining unit 303 scans a product to acquire a product image, acquires the gray values of pixels of the product image in the inspection area, and calculates a product image definition. Specifically, firstly the product scanning subunit 3031 scans the product to acquire the product image, and then, the image definition calculating subunit 3032 acquires the gray values of pixels of the product image in the inspection area, and calculates the product image definition.

Figure 9:
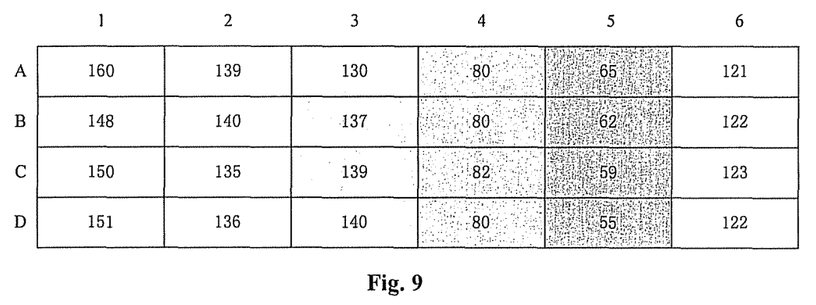
FIG. 9 is a schematic diagram showing distribution of pixel grays in the rectangular inspection area of a product image in an embodiment of the present disclosure.

FIG. 9 schematically shows the distribution of pixel grays of the product image in the inspection area of the rectangular box 401. The calculation performed by the product image definition calculating subunit 3032 is illustrated with the pixel gray distribution shown in FIG. 9 as an example.

The gray values of each row of pixels are acquired. The absolute value of a difference between the gray values of adjacent pixels of each row is calculated respectively. For example, in the row A, it can be obtained that |A1−A2|=21, |A2−A3|=9, |A3−A4|=50, |A4−A5|=15, and |A5−A6|=56 through calculation. Thus the maximum absolute value in the row A is 56, and the row gray difference of the product image is 56. Similarly, the row gray differences in the rows B, C and D are calculated, and are respectively 60, 64 and 67. The maximum value, 67, of the row gray differences of the product image is selected as the product image definition.

In Step S604 of the method, the comparison unit 304 judges whether the product image definition is greater than the image definition threshold. When the product image definition is greater than the image definition threshold, a product image selecting step S605 is executed. And when the product image definition is smaller than the image definition threshold, the product image definition determining step S603 is executed, wherein the product image definition determining unit 303 is called to scan the product again.

In Step S605 of the method, the product image selecting unit 305 selects the current product image as an image to be inspected, when the product image definition is greater than the image definition threshold.

In this embodiment, the product image definition 67 is greater than the image definition threshold 66, and therefore, the current product image is selected as the image to be inspected for subsequent optical inspection.

For different types of products, the definition threshold determining unit 302 may, in step S602, calculate the definition thresholds corresponding to the products through multiple times of scanning, so that accurate AOI inspection can be provided for each type of the products.

During the image processing, because only the gray difference of the pixels in the inspection area adjacent to the measurement object is calculated according to the embodiments of the present disclosure, the calculation is low load, simple, and convenient. Therefore, the inspection efficiency may be greatly improved.

According to the embodiments of the present disclosure, the calculation of image definition is added in the image processing process, and the definition threshold is set, Therefore, an inspection standard for identical products can be provided in the presence of machine vibration, so that the inspection quality of the AOI equipment is improved.

Although the implementations disclosed by the present disclosure are described above, the contents are implementations merely adopted to facilitate understanding of the present disclosure, rather than limiting the present disclosure. Any skilled in the art to which the present disclosure pertains may make any modifications and variations on implementation forms and details without departing from the disclosed spirit and scope of the present disclosure, but the patent protection scope of the present disclosure shall be subject to the scope defined by the appended claims.

The invention claimed is:

1. An image processing method for used in an automated optical inspection process, including:
   an inspection area determining step, executed by an image processing device, for determining a rectangular inspection area in an inspected image;
   a definition threshold determining step, executed by the image processing device, for calculating an image definition threshold according to the gray values of pixels of the plurality of sample images in the inspection area;
   a product image definition determining step, executed by the image processing device, for calculating a product image definition according to the gray values of pixels of the product image in the inspection area; and
   a comparison step, executed by the image processing device, for comparing the product image definition with the image definition threshold, wherein when the product image definition is greater than the image definition threshold, a product image selecting step for selecting the current product image as an image to be inspected is executed, and when the product image definition is smaller than the image definition threshold, the product image definition determining step is executed;
   wherein the definition threshold determining step includes:
   a sample scanning step, executed by the image processing device, for scanning one and the same inspection sample for multiple times to acquire a plurality of sample images matched with a standard image; and
   a threshold calculating step, executed by the image processing device, for acquiring the gray values of pixels of the plurality of sample images in the inspection area respectively and calculating the image definition threshold;
   wherein the threshold calculating step includes:
   acquiring, by the image processing device, the gray values of pixels of each sample image in the inspection area;
   calculating, by the image processing device, the absolute value of a difference between the gray values of adjacent pixels of each row of each sample image in the inspection area respectively, selecting the maximum absolute value as a sample image row gray difference, and selecting the maximum sample image row gray difference as the sample definition of the current sample image; and
   selecting, by the image processing device, the minimum of all sample definitions as the image definition threshold.

2. The image processing method according to claim 1, wherein the product image definition determining step includes:
   a product scanning step, executed by the image processing device, for scanning a product to acquire the product image; and
   an image definition calculating step, executed by the image processing device, for acquiring the gray values of pixels of the product image in the inspection area and calculating the product image definition.

3. The image processing method according to claim 2, wherein the threshold calculating step includes:
   acquiring, by the image processing device, the gray values of pixels of each sample image in the inspection area;

calculating, by the image processing device, the absolute value of a difference between the gray values of adjacent pixels of each row of each sample image in the inspection area respectively, selecting the maximum absolute value as a sample image row gray difference, and selecting the maximum sample image row gray difference as the sample definition of the current sample image; and selecting, by the image processing device, the minimum of all sample definitions as the image definition threshold.

4. The image processing method according to claim 3, wherein the image definition calculating step includes:

acquiring, by the image processing device, the gray values of pixels of the product image in the inspection area; and calculating, by the image processing device, the absolute value of a difference between the gray values of adjacent pixels of each row of the product image in the inspection area respectively, selecting the maximum absolute value as a product image row gray difference, and selecting the maximum product image row gray difference as the product image definition.

5. The image processing method according to claim 1, wherein the image definition calculating step includes:

acquiring, by the image processing device, the gray values of pixels of the product image in the inspection area; and calculating, by the image processing device, the absolute value of a difference between the gray values of adjacent pixels of each row of the product image in the inspection area respectively, selecting the maximum absolute value as a product image row gray difference, and selecting the maximum product image row gray difference as the product image definition.

6. An image processing device for use in an automated optical inspection machine, including:

an inspection area determining unit, configured to determine a rectangular inspection area in an inspected image;

a definition threshold determining unit, configured to calculate an image definition threshold according to the gray values of pixels of the plurality of sample images in the inspection area;

a product image definition determining unit, configured to calculate a product image definition according to the gray values of pixels of the product image in the inspection area;

a comparison unit, configured to compare the product image definition with the image definition threshold, wherein when the product image definition is greater than the image definition threshold, a product image selecting unit is called, and when the product image definition is smaller than the image definition threshold, the product image definition determining unit is called; and the product image selecting unit, configured to select the current product image as an image to be inspected, wherein, the inspection area determining unit, the definition threshold determining unit, the product image definition determining unit, the comparison unit and the product image selecting unit are controlled by the image processing device;

wherein the definition threshold determining unit further includes:

a sample scanning subunit, configured to scan one and the same inspection sample for multiple times to acquire a plurality of sample images matched with a standard image: and a threshold calculating subunit, configured to acquire the gray values of pixels of each sample image in the inspection area, calculate the absolute value of a difference between the gray values of adjacent pixels of each row of each sample image in the inspection area respectively, select the maximum absolute value as a sample image row gray difference, select the maximum sample image row gray difference as the sample definition of the current sample image, and select the minimum of all sample definitions as the image definition threshold.

7. The image processing device according to claim 6, wherein the product image definition determining unit further includes:

a product scanning subunit, configured to scan a product to acquire a product image; and an image definition calculating subunit, configured to acquire the gray values of pixels of the product image in the inspection area, calculate the absolute value of a difference between the gray values of adjacent pixels of each row of the product image in the inspection area respectively, select the maximum absolute value as a product image row gray difference, and select the maximum product image row gray difference as the product image definition.

8. The image processing device according to claim 6, wherein the product image definition determining unit further includes:

a product scanning subunit, configured to scan a product to acquire a product image; and an image definition calculating subunit, configured to acquire the gray values of pixels of the product image in the inspection area, calculate the absolute value of a difference between the gray values of adjacent pixels of each row of the product image in the inspection area respectively, select the maximum absolute value as a product image row gray difference, and select the maximum product image row gray difference as the product image definition.

9. An automated optical inspection machine, including: an image processing device, comprising:

an inspection area determining unit, configured to determine a rectangular inspection area in an inspected image;

a definition threshold determining unit, configured to calculate an image definition threshold according to the gray values of pixels of the plurality of sample images in the inspection area;

a product image definition determining unit, configured to calculate a product image definition according to the gray values of pixels of the product image in the inspection area;

a comparison unit, configured to compare the product image definition with the image definition threshold, wherein when the product image definition is greater than the image definition threshold, a product image selecting unit is called, and when the product image definition is smaller than the image definition threshold, the product image definition determining unit is called; and the product image selecting unit, configured to select the current product image as an image to be inspected, and an inspection device configured to perform optical inspection according to the image to be inspected wherein, the inspection area determining unit, the definition threshold determining unit, the product image definition determining unit, the comparison unit and the product image selecting unit are controlled by the image processing device;

wherein the definition threshold determining unit further includes:

a sample scanning subunit, configured to scan one and the same inspection sample for multiple times to acquire a plurality of sample images matched with a standard image; and a threshold calculating subunit, configured to acquire the gray values of pixels of each sample image in the inspection area, calculate the absolute value of a difference between the gray values of adjacent pixels of each row of each sample image in the inspection area respectively, select the maximum absolute value as a sample image row gray difference, select the maximum sample image row gray difference as the sample definition of the current sample image, and select the minimum of all sample definitions as the image definition threshold.

10. The automated optical inspection machine according to claim 9, wherein the product image definition determining unit further includes:

a product scanning subunit, configured to scan a product to acquire a product image; and an image definition calculating subunit, configured to acquire the gray values of pixels of the product image in the inspection area, calculate the absolute value of a difference between the gray values of adjacent pixels of each row of the product image in the inspection area respectively, select the maximum absolute value as a product image row gray difference, and select the maximum product image row gray difference as the product image definition.

11. The automated optical inspection machine according to claim 9, wherein the product image definition determining unit further includes:

a product scanning subunit, configured to scan a product to acquire a product image; and an image definition calculating subunit, configured to acquire the gray values of pixels of the product image in the inspection area, calculate the absolute value of a difference between the gray values of adjacent pixels of each row of the product image in the inspection area respectively, select the maximum absolute value as a product image row gray difference, and select the maximum product image row gray difference as the product image definition.

* * * * *